United States Patent
Truesdell et al.

[11] 3,715,256
[45] Feb. 6, 1973

[54] METHOD OF MAKING AN EMBOSSED PANEL

[75] Inventors: Robert E. Truesdell, Rochester; William H. Nienstedt, Detroit, both of Mich.

[73] Assignee: Allied Chemical Corporation, New York, N.Y.

[22] Filed: Sept. 8, 1969

[21] Appl. No.: 855,813

Related U.S. Application Data

[62] Division of Ser. No. 530,931, March 1, 1966, Pat. No. 3,471,355.

[52] U.S. Cl. ............... 156/244, 156/228, 156/245, 156/272, 156/273, 156/280, 156/293, 156/306
[51] Int. Cl. ............................................. B29c 19/00
[58] Field of Search......156/244, 273, 293, 272, 306, 156/280, 242, 245, 228

[56] References Cited

UNITED STATES PATENTS

| | | | |
|---|---|---|---|
| 3,046,179 | 7/1962 | Stallard | 156/273 X |
| 3,047,451 | 7/1962 | Beck et al. | 156/273 UX |
| 3,052,587 | 9/1962 | Spieles | 156/273 X |
| 3,107,190 | 10/1963 | Kevelin | 156/273 X |
| 3,244,571 | 4/1966 | Weisman | 156/273 X |
| 3,265,551 | 8/1966 | Ananian et al. | 156/273 X |
| 3,471,355 | 10/1969 | Truesdell et al. | 156/273 X |

*Primary Examiner*—Carl D. Quarforth
*Assistant Examiner*—Stephen J. Lechert, Jr.
*Attorney*—Marvin Bressler and Jonathon Plaut

[57] ABSTRACT

A method of making an embossed panel including dual extruding a molding strip in the form of a composite duplex structure having a plastic support member with a first heat sealable plastic layer fused thereto and disposing a second heat sealable plastic layer onto a panel backing member. The first and second heat sealable layers are disposed adjacent one another and are heat sealed and fused together to conjoin the molding strip to the second heat sealable layer such that the support member projects from the panel.

12 Claims, 7 Drawing Figures

PATENTED FEB 6 1973 3,715,256

INVENTORS
Robert E. Truesdell &
William H. Nienstedt
Barnard, McGlynn & Reising
ATTORNEYS

METHOD OF MAKING AN EMBOSSED PANEL

This application is a division of application Ser. No. 530,931 filed Mar. 1, 1966 now U.S. Pat. No. 3,471,355.

This invention relates to a panel molding structure and more particularly to a molding for dielectric heat sealing to a panel board in which the molding is provided with a unitary duplex body, one portion of which comprises a dielectrically sealable layer and another portion comprises a supporting body or carrier, the two portions being dual extruded into a unitary fused member.

The invention in one form involves extruding a relatively thin layer of a dielectrically heat sealable plastic material, such as an elastomeric vinyl upon a portion of a supporting body or carrier such as a hard, relatively rigid, filled vinyl, or an acetate, or a styrene, or a combination of acetate and styrene plastic material. In another form of the invention, the supporting body or carrier can be a relatively inexpensive soft vinyl containing a low cost filler material that can be shaped by a dielectric heat sealing die and take a form complementary with the form of such die. The invention involves the dual extrusion of both the carrier and the dielectrically heat sealable plastic layer to form a fused unitary member. The heat sealable layer is preferably made of relatively pure vinyl or vinyl with a color filler, its durometer being relatively low, about the order of 65 to 75.

In the combination for which the duplex unitary member is particularly designed and in which it is conjoined by dielectric heat sealing, the mating part or component of the duplex member is a heat sealable plastic layer which is fused to another heat sealable compatible plastic layer on a second member by dielectrical heating. This combination is readily employed in securing moldings to interior panels in automobiles. The present invention avoids the myriad disadvantages and shortcomings encountered when mechanical fasteners are used to secure moldings to interior panels in automobiles, and also constitutes an improvement upon vinyl or plastic clad molding strips heretofore known and used in combination with interior automobile panels.

The present invention provides a composite duplex structure which includes a plastic support member that may be composed, for example, of a styrene, a vinyl, a butyrate, an acrylic, a polyethylene or equivalent plastic material. The plastic employed for the carrier or support member may be used in substantially a pure condition or having an admixed filler, such for example as inorganic pigments, metallic oxides, mineral powders, diatomaceous earths, synthetic fibers, or powdered metals. The composite duplex structure also includes a first dielectrically heat sealable plastic layer which is disposed on a portion of the plastic support member. The plastic support member and the first heat sealable plastic layer are formed or fused into a unitary duplex fused body by a process of dual extrusion. This extruded duplex body is joined to a second body or member having a second dielectrically heat sealable layer. To accomplish this, the first and second heat sealable layers are disposed adjacent one another and are fused to each other by dielectrically heat sealing to conjoin the extruded duplex body and the second body.

In one embodiment of the present invention adapted for use as a panel molding, the structure includes a metal channel or cover strip within which the extruded duplex body is disposed. The first heat sealable plastic layer is exposed and not covered by the metal channel strip. The metal channel strip and the extruded duplex body form an elongated panel molding strip. The first heat sealable plastic layer of the duplex body is dielectrically fused to the second heat sealable plastic layer of the second body to conjoin the panel molding strip to the second body. A relatively rigid backing member, such as fiber board, forms part of the second body in the embodiment now being described. A resilient cushioning layer also forms a part of the second body and is disposed adjacent the relatively rigid backing member. The second heat sealable plastic layer is disposed on a surface of the resilient cushioning layer remote from the backing member.

One object of the invention is to provide a composite molding structure which may be secured to other members by dielectric heating and without the use of mechanical fasteners. Another object is to provide a novel panel molding strip including a dually extruded duplex body, optionally having a metal covering, a polyester covering, or no covering and which may be fusibly secured to a panel, or other body, having a plastic fusible layer thereon. A further object is to provide a panel molding structure including a composite extruded body which may be formed of one or two plastics, with or without fillers, which extruded body is bonded by dielectric heat sealing to a plastic layer of another body, such plastic layer being formed on a plastic compatible with an adhering fusible plastic layer of the extruded body.

Other objects, structural features and advantages of the invention will become apparent from the following description taken in conjunction with the accompanying drawings in which.

Figure 1:
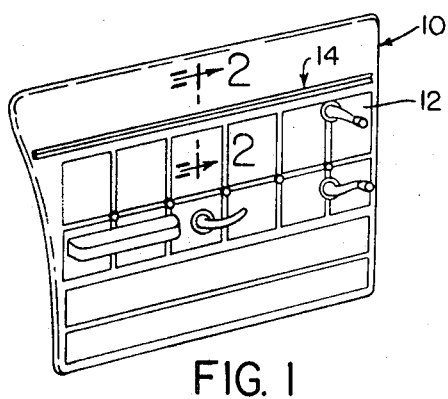
FIG. 1 is a perspective view of an automobile interior door panel having a molding strip conjoined thereto in accordance with the present invention.
Figure 2:
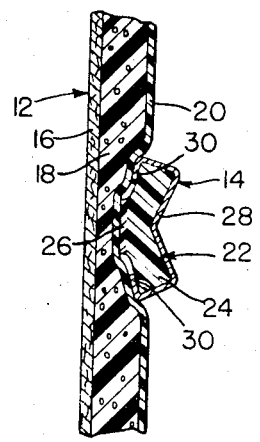
FIG. 2 is a partial vertical sectional view taken substantially along the line 2—2 of FIG. 1.
Figure 3:
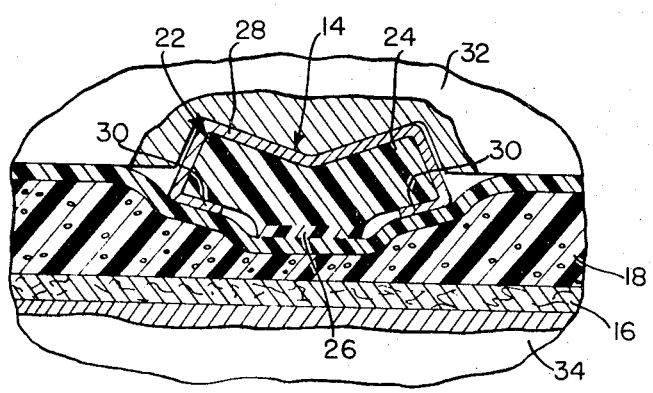
FIG. 3 is a slightly enlarged view similar to that shown in FIG. 2 and including fragmentary portions of a pair of dielectric heat sealing dies.

With reference particularly to the embodiment illustrated in FIGS. 1 through 3 inclusive, the panel molding strip structure 10 comprises an interior panel 12 and a molding strip 14 secured to the panel.

The panel 12 comprises, in the form shown, a backing member 16 which may be more or less flexible in nature, although a relatively rigid member such as fiber board is preferred, a resilient cushioning layer 18 of a vinyl impregnated urethane, a rubberized or plastic coated fibrous material, or equivalent, and a relatively thin heat sealable plastic layer 20 such as a vinyl layer.

The molding strip 14, in the embodiment illustrated in FIGS. 1 though 3, comprises an elongated unitary duplex body 22 having a plastic carrier or support portion 24 of relatively firm and rigid, yet flexible, material such as a pigmented vinyl, characterized by a durometer of 100 or more, and a relatively thin dielectrically heat sealable plastic layer 26, of a relatively softer vinyl layer, characterized by a durometer of 65 to 75. The supporting portion 24 and the heat sealable layer 26 are formed into the unitary duplex body 22 by a dual extrusion process. In the dual extrusion process the supporting portion 24 and the heat sealable layer 26 are co-extruded out of the same extrusion nozzle head. A metal channel or cover 28 is placed upon the extruded body 22 in such manner that the heat sealable plastic layer is left exposed for contact with the plastic layer 20 of the panel 12. The metal channel 28 is provided with inturned flanges 30, 30 extending longitudinally of the strip 14 to aid securement to the duplex body 22.

In FIG. 3 is illustrated how the metal covered panel molding strip 14 is dielectrically heat sealed to the panel 12. The die electrodes 32,34 of the dielectric heating equipment (not shown) press the 32, 34 strip firmly into the panel so that the strip layer 26 makes close intimate contact with the layer 20 of the panel, and while so pressed together, pass a high voltage current through the materials to heat seal and fuse the layers together under pressure, whereby the strip 14 is bonded to the panel 12. The inturned flanges 30 of the metal channel 28 are disposed between the support portion 24 and the heat sealable plastic layer 20 of the panel 12 so that it is retained upon the duplex extruded body 22.

Figure 4:
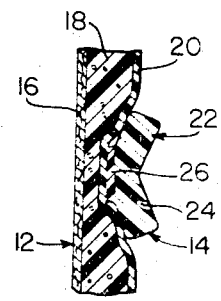
FIG. 4 is a view similar to FIG. 2 but illustrating a molding strip having no metal cover on the duplex extruded body.

A second embodiment of the invention is illustrated in FIG. 4, wherein the duplex extruded body 22 is employed without any covering. In this form, the surface character of the dielectric heat sealing die electrode 32 determines the configuration and surface finish of the support portion 24. The duplex body layer 26 and the panel layer 20 are fused together by dielectric heating, similar to the structure shown in FIG. 3.

Figure 5:
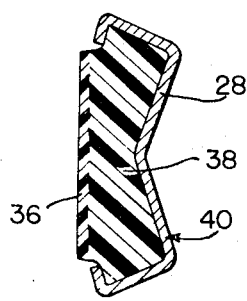
FIG. 5 is a transverse cross-sectional view of a molding strip of a third embodiment having a wider first heat sealable plastic layer.
Figure 6:
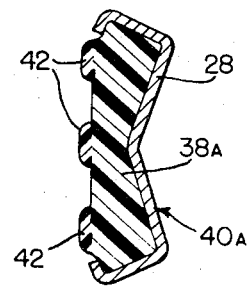
FIG. 6 is a view similar to FIG. 5 of a fourth embodiment having a series of parallel heat sealable plastic strips disposed on the carrier or supporting portion of the duplex body.

In FIG. 5, a wider heat sealable plastic layer 36 is extruded upon and coincident with the extrusion of the support portion 38 to form a slightly modified duplex body 40, to which the metal channel 28 can be secured. Alternatively, the single plastic layer 36 can be divided into a number of longitudinally extending ribbon strips 42, 42, 42, as shown in FIG. 6, which are dual extruded upon and with the support portion 38A of the duplex body 40A.

Figure 7:
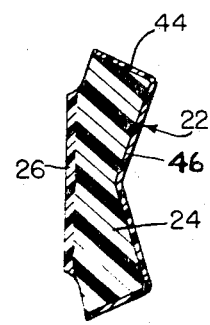
FIG. 7 is a view similar to FIG. 5 of a fifth embodiment having a polyester coating on the duplex extruded body.

In FIG. 7 is illustrated a molding strip duplex body 22 to which is secured by heat sealing a polyester coating 44, such as mylar, in place of the metal channel or cover strip. A metallized vacuum deposited coating can be applied to the exterior surface 46 of the duplex body 22, except in the area of the plastic layer 26, as an alternative coating.

The three plastic components, viz., the heat sealable plastic layer 20, the support member 24, and the heat sealable plastic layer 26 or 36, or the strips 42, may be made of the same or different types of plastic material, as desired, so long as these materials are compatibly heat fusible. It is preferred to use a relatively hard plastic, such as styrene, or a plastic with a strengthening filler for the support portion 24 of the duplex body 22. A durable plastic, perhaps with coloring and strengthening fillers, would appear to be especially desirable for the FIG. 4 embodiment which lacks a metallic or polyester covering. The three plastic components may be selected from vinyls, styrenes, acrylics, butyrates, polyethylenes, any of the foregoing with fillers, copolymers of any of the foregoing, and other plastic materials. It has been found satisfactory to employ a soft vinyl plastic for the heat sealable layers, but one type of plastic may be used for one heat sealable layer and a different but fusibly compatible type plastic may be used for the other mating heat sealable layer.

It is to be understood that, although the invention has been described with specific reference to particular embodiments thereof, it is not so limited since changes and alterations therein may be made which are within the full intended scope of this invention as defined by the appended claims.

The embodiments of the invention in which an exclusive property or privilege is claimed are defined as follows:

1. A method of making an embossed panel comprising: dual extruding, from the same extrusion nozzle, a composite duplex structure of non-uniform thickness having a plastic support member with a first heat sealable plastic layer fused thereto; disposing a second heat sealable plastic layer onto a panel backing member; disposing said first and second heat sealable layers adjacent one another; and heat sealing and fusing said first and second heat sealable layers to each other to conjoin the duplex structure to the second heat sealable layer.

2. A method of making an embossed panel comprising: dual extruding, from the same extrusion nozzle, a molding strip duplex body of non-uniform thickness having a plastic support portion with a first dielectrically heat sealable plastic layer fused thereto; disposing a second heat sealable plastic layer onto a panel backing member; disposing said first and second heat sealable plastic layers adjacent one another with the plastic support portion projecting outwardly from the surface of said second heat sealable plastic layer; placing a first die electrode against said support portion and a second die electrode against said panel backing member on the side thereof opposite said second heat sealable layer, pressing the first and second heat sealable layers together into close intimate contact, and passing a high voltage current through the materials to heat seal and fuse said first and second heat sealable layers together.

3. A method of making an embossed panel comprising: dual extruding, from the same extrusion nozzle, a composite duplex structure of non-uniform thickness having a plastic support member with a first dielectrically heat sealable plastic layer fused thereto and having a width less than the width of the support member; disposing a second dielectrically heat sealable plastic layer onto a panel backing member; placing the first dielectrically heat sealable layer against the second dielectrically heat sealable layer with the support member projecting from the surface of the second dielectrically heat sealable layer; and passing a high voltage current through the layers of material to heat seal and fuse said dielectrically heat sealable layers together and conjoin the duplex structure to said second dielectrically heat sealable layer.

4. A method as claimed in claim 3 further including heat sealing a polyester coating onto the exposed surface of the support member.

5. A method of making an embossed panel comprising: dual extruding, from the same extrusion nozzle, a composite duplex structure of non-uniform thickness having a plastic support member with a first dielectrically heat sealable plastic layer fused thereto and having a width less than the width of the support member; placing a cover on the support member with inturned flanges between which the first dielectrically heat sealable plastic layer is exposed; disposing a second dielectrically heat sealable plastic layer onto a panel backing member; placing the first dielectrically heat sealable plastic layer against the second dielectrically heat sealable plastic layer with the inturned flanges of the cover disposed between the support member and the second heat sealable plastic layer; and passing a high voltage current through the layers of material to heat seal and fuse said dielectrically heat sealable layers together and conjoin the duplex structure to said second dielectrically heat sealable layer.

6. A method of making an embossed panel comprising: dual extruding, from the same extrusion nozzle, a composite, dual layer molding strip of non-uniform thickness having a supporting layer composed of a plastic material that can be shaped by a dielectric heat sealing die and a first dielectrically heat sealable plastic layer fused thereto; disposing a second dielectrically heat sealable plastic layer onto a panel backing member; placing the first and second heat sealable layers together with the supporting layer projecting outwardly from the surface of said second dielectrically heat sealable layer; placing a first die electrode against said supporting layer having a form complementary with the desired configuration and surface finish of said supporting layer; placing a second die electrode against said panel backing member on the opposite side thereof from said molding strip; pressing the first and second heat sealable layers together into close intimate contact; and passing a high voltage current through the materials to heat seal and fuse said first and second heat sealable layers together and simultaneously form said support layer into said desired configuration.

7. A method of making an embossed panel having a heat sealable plastic layer comprising: dual extruding, from the same extrusion nozzle, a molding strip in the form of a composite duplex structure of non-uniform thickness having a relatively hard plastic supporting body with a relatively thin layer of dielectrically heat sealable plastic material fused thereto; placing the relatively soft, thin layer of dielectrically heat sealable plastic of said duplex structure against the heat sealable plastic layer of the panel; and passing a high voltage current through the molding strip and heat sealable plastic layer of the panel to heat seal and fuse the relatively soft thin layer of the duplex structure to the heat sealable plastic layer of the panel to conjoin the molding strip to the panel with the supporting body projecting outwardly therefrom.

8. A method as claimed in claim 7 wherein said supporting body is composed of relatively hard, rigid vinyl, and said relatively soft, thin layer of said duplex structure is composed of relatively soft, elastomeric vinyl.

9. A method as claimed in claim 8 wherein said relatively soft, thin layer of said duplex structure is characterized by a hardness of about 65 to 75 on a durometer scale.

10. A method as claimed in claim 7 wherein the supporting body is composed of vinyl material that can be shaped by a dielectric heat sealing die and take the form of such die, and further comprising shaping said supporting body with a dielectric heat sealing die simultaneously with the heat sealing the relatively soft, thin layer of said duplex structure to the panel.

11. A method as claimed in claim 10 wherein the relatively soft, thin layer of said duplex structure is composed of vinyl characterized by a hardness of about 65 to 75 on a durometer scale.

12. A method of making an embossed panel comprising: dual extruding, from the same extrusion nozzle, a composite duplex structure of non-uniform thickness including a plastic support member composed of material taken from the group consisting of vinyl, styrene, acrylic, butyrate, and polyethylene and characterized by a hardness of about 100 or more on a durometer scale with a first dielectrically heat sealable plastic layer fused thereto having a width less than the support member with the support member projecting beyond both edges thereof and composed of material selected from the group consisting of vinyl, styrene, acrylic, butyrate, and polyethylene, and characterized by a hardness of about 65 to 75 on a durometer scale; disposing a second dielectrically heat sealable plastic layer on a panel backing member, said second dielectrically heat sealable plastic layer being composed of material selected from the group consisting of vinyl, styrene, acrylic, butyrate, and polyethylene; disposing said first and second heat sealable layers adjacent one another; and dielectrically heat sealing said first and second heat sealable layers to each other to conjoin the duplex structure to the second heat sealable layer with the support member projecting from the second heat sealable layer and with the edges of the support member projecting laterally from the conjoined portion of the heat sealable layers.

* * * * *